(12) United States Patent  
DeDobbelaere et al.

(10) Patent No.: US 10,020,884 B2  
(45) Date of Patent: *Jul. 10, 2018

(54) METHOD AND SYSTEM FOR A BI-DIRECTIONAL MULTI-WAVELENGTH RECEIVER FOR STANDARD SINGLE-MODE FIBER BASED ON GRATING COUPLERS

(71) Applicant: Luxtera, Inc., Carlsbad, CA (US)

(72) Inventors: Peter DeDobbelaere, San Diego, CA (US); Christopher Bergey, San Jose, CA (US); Attila Mekis, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,197

(22) Filed: Aug. 14, 2017

(65) Prior Publication Data

US 2017/0346567 A1  Nov. 30, 2017

Related U.S. Application Data

(63) Continuation of application No. 14/612,496, filed on Feb. 3, 2015, now Pat. No. 9,735,869.

(Continued)

(51) Int. Cl.
*H04J 14/02* (2006.01)
*H04B 10/25* (2013.01)
(Continued)

(52) U.S. Cl.
CPC ......... *H04B 10/2503* (2013.01); *G02B 6/124* (2013.01); *G02B 6/12007* (2013.01);
(Continued)

(58) Field of Classification Search
CPC ............... H04B 10/2503; H04B 10/40; G02B 6/12007; G02B 6/124; G02B 6/34;
(Continued)

(56) References Cited

U.S. PATENT DOCUMENTS 7,136,546 B2 * 11/2006 Kish, Jr. ............... B82Y 20/00  
    372/50.1  
8,594,503 B2 * 11/2013 Roelkens ........... G02B 6/12007  
    385/15

(Continued)

*Primary Examiner* — Tesfaldet Bocure  
(74) *Attorney, Agent, or Firm* — McAndrews, Held & Malloy

(57) ABSTRACT

Methods and systems for a bi-directional receiver for standard single-mode fiber based on grating couplers may include, in an integrated circuit comprising an optoelectronic transceiver, a multi-wavelength grating coupler, and first and second optical sources coupled to the integrated circuit: coupling first and second source optical signals at first and second wavelengths into the photonically-enabled integrated circuit using the first and second optical sources, where the second wavelength is different from the first wavelength, receiving a first optical data signal at the first wavelength from an optical fiber coupled to the multi-wavelength grating coupler, and receiving a second optical data signal at the second wavelength from the optical fiber. Third and fourth optical data signals at the first and second wavelengths may be communicated out of the optoelectronic transceiver via the multi-wavelength grating coupler.

20 Claims, 6 Drawing Sheets

Related U.S. Application Data

(60) Provisional application No. 61/965,611, filed on Feb. 3, 2014, provisional application No. 62/122,718, filed on Oct. 28, 2014.

(51) Int. Cl.
- *G02B 6/124* (2006.01)
- *G02B 6/12* (2006.01)
- *G02B 6/30* (2006.01)
- *G02B 6/34* (2006.01)
- *H04B 10/40* (2013.01)

(52) U.S. Cl.
CPC ............... *G02B 6/305* (2013.01); *G02B 6/34* (2013.01); *H04B 10/40* (2013.01); *H04J 14/0202* (2013.01)

(58) Field of Classification Search
CPC .. G02B 6/305; H04J 14/0202; H04J 14/0213; H04J 14/02; H02B 6/29383

See application file for complete search history.

(56) References Cited

U.S. PATENT DOCUMENTS

| | | | |
|---|---|---|---|
| 9,467,227 B2* | 10/2016 | Masini | H04B 10/40 |
| 2008/0025350 A1* | 1/2008 | Arbore | G02B 6/12011 |
| | | | 372/20 |
| 2010/0322555 A1* | 12/2010 | Vermeulen | G02B 6/12007 |
| | | | 385/28 |
| 2011/0305416 A1* | 12/2011 | Mekia | G02B 6/43 |
| | | | 385/28 |
| 2012/0301149 A1* | 11/2012 | Pinguet | H01L 21/84 |
| | | | 398/115 |
| 2014/0241721 A1* | 8/2014 | Xia | H04J 14/02 |
| | | | 398/51 |
| 2015/0219847 A1* | 8/2015 | Mack | G02B 6/4286 |
| | | | 385/14 |
| 2015/0381273 A1* | 12/2015 | Gloeckner | H04B 10/40 |
| | | | 398/16 |
| 2016/0036550 A1* | 2/2016 | Welch | G02B 6/4215 |
| | | | 398/87 |
| 2016/0119057 A1* | 4/2016 | Mekis | H04J 14/02 |
| | | | 398/51 |
| 2016/0156999 A1* | 6/2016 | Liboiron-Ladouceur | H04Q 11/0005 |
| | | | 398/51 |
| 2016/0238793 A1* | 8/2016 | Frankel | G02B 6/305 |
| 2016/0246018 A1* | 8/2016 | Pinguet | H01L 21/84 |
| 2016/0320576 A1* | 11/2016 | Mack | G02B 6/4286 |
| 2016/0349544 A1* | 12/2016 | Mekis | G02F 1/313 |

* cited by examiner

METHOD AND SYSTEM FOR A BI-DIRECTIONAL MULTI-WAVELENGTH RECEIVER FOR STANDARD SINGLE-MODE FIBER BASED ON GRATING COUPLERS

CROSS-REFERENCE TO RELATED APPLICATIONS/INCORPORATION BY REFERENCE

This application is a continuation of U.S. patent application Ser. No. 14/612,496 field on Feb. 3, 2015, now U.S. Pat. No. 9,735,869, which claims priority to and the benefit of U.S. Provisional Application No. 61/965,611 filed on Feb. 3, 2014, and U.S. Provisional Application No. 62/122,718 filed on Oct. 28, 2014, each of which is hereby incorporated herein by reference in its entirety.

FIELD

Certain embodiments of the disclosure relate to semiconductor photonics. More specifically, certain embodiments of the disclosure relate to a method and system for a bi-directional multi-wavelength transceiver for standard single-mode fiber based on grating couplers.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for a bi-directional multi-wavelength transceiver for standard single-mode fiber based on grating couplers, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for a bi-directional multi-wavelength transceiver for standard single-mode fiber based on grating couplers. Exemplary aspects of the disclosure may comprise, a photonically-enabled integrated circuit comprising an optoelectronic transceiver, and first and second grating couplers, where the photonically-enabled integrated circuit is operable to: communicate a first optical data signal from the optoelectronic transceiver into a first fiber coupled to the first grating coupler, receive a second optical data signal from the first optical fiber coupled to the first grating coupler, communicate a third optical data signal from the optoelectronic transceiver into a second optical fiber coupled to the second grating coupler, and receive a fourth optical data signal from the second optical fiber coupled to the second grating coupler. The first and third optical data signals may be at a first wavelength, and the second and fourth optical data signals may be at a second wavelength different from the first wavelength. The photonically-enabled integrated circuit may comprise a complementary metal-oxide semiconductor (CMOS) chip. The first and second optical fibers may comprise single mode fibers. The first optical data signal may be generated utilizing a first optical source assembly coupled to the photonically-enabled integrated circuit and the second optical data signal may be generated utilizing a second optical source assembly coupled to the photonically-enabled integrated circuit.

Figure 1A:
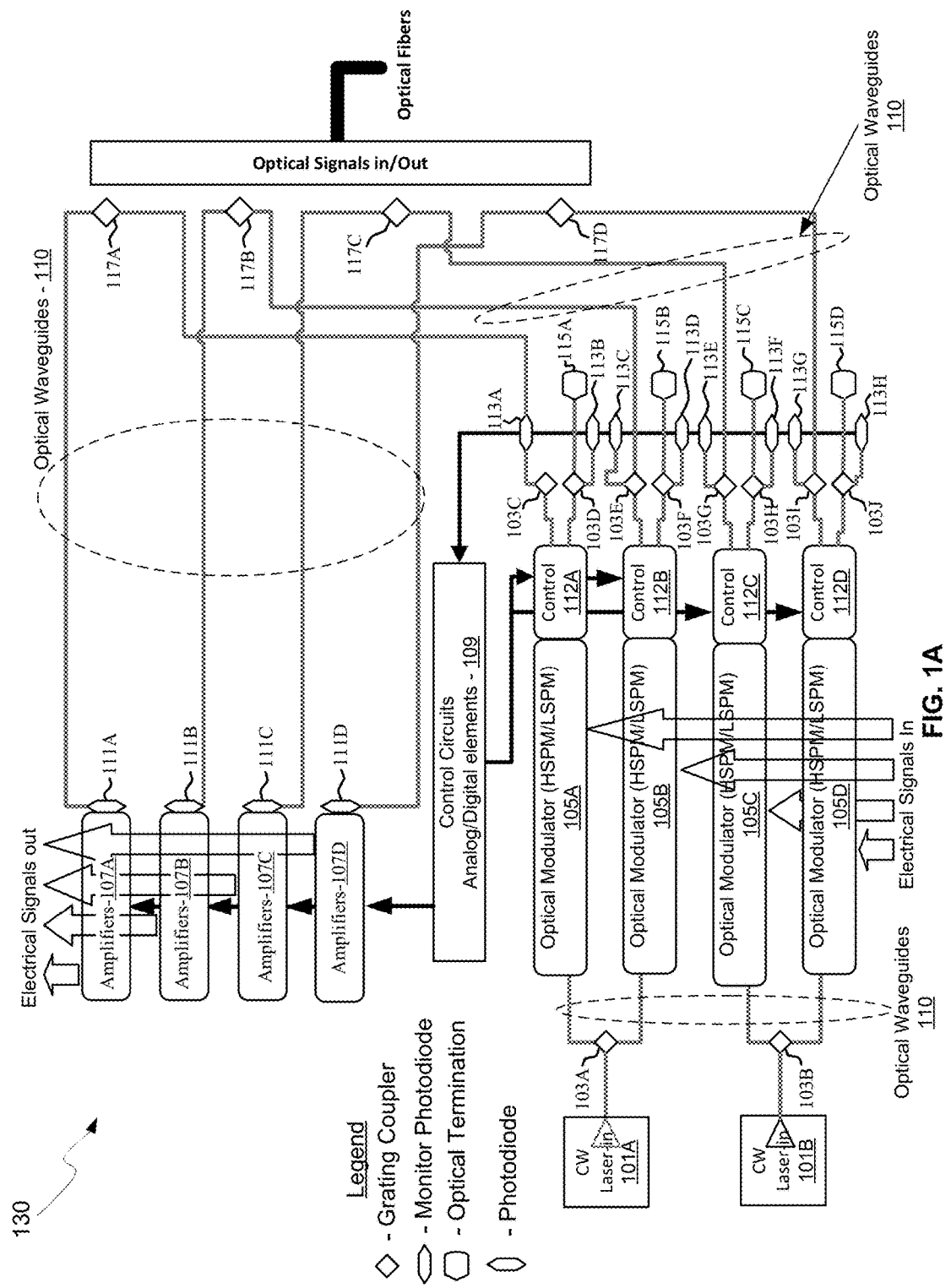
FIG. 1A is a block diagram of a photonically-enabled integrated circuit with a bi-directional multi-wavelength transceiver, in accordance with an example embodiment of the disclosure.

FIG. 1A is a block diagram of a photonically-enabled integrated circuit with a bi-directional multi-wavelength transceiver, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, and optical devices comprising couplers 103A-103J, optical terminations 115A-115D, and grating couplers 117A-117D. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example. In an example scenario, the photonically-enabled integrated circuit 130 comprises a CMOS photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The outputs of the modulators 105A-105D may be optically coupled via the waveguides 110 to the grating couplers 117A-117D. The couplers 103C-103J may comprise four-port optical couplers, for example, and may be utilized to sample or split the optical signals generated by the optical modulators 105A-105D, with the sampled signals being measured by the monitor photodiodes 113A-113H. The unused branches of the directional couplers 103C-103J may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into and out of the photonically-enabled integrated circuit 130. The grating couplers 117A-117D may comprise single polarization grating couplers (SPGC), polarization splitting grating couplers (PSGC), demultiplexing grating couplers (DMGC), and/or bi-wavelength polarization-multiplexing grating couplers (PMGC). Example PSGC and PMGC structures are described in incorporated application Ser. No. 62/122,718 filed on Oct. 28, 2014. In instances where a PSGC or a PMGC is utilized, two input, or output, waveguides may be utilized. In instances where a DMGC is utilized, four input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

In an example embodiment, optical signals may be generated by the CW laser In 101A and 101B, which may comprise an assembly mounted to the photonically-enabled integrated circuit 130, and may generate different wavelengths for multi-wavelength operation of the photonically-enabled integrated circuit 130. For example, 1310 nm and 1490 nm wavelength optical signals may be generated in the CW laser In 101A and 101B, respectively. Accordingly, the grating couplers 103A and 103B may be configured for a desired wavelength. In another example scenario, each CW laser In 101A and 101B may comprise multiple wavelength outputs and the grating couplers 103A and 103B may be configured to receive multiple wavelengths.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A and 103B. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry (not shown) in the photonically-enabled integrated circuit 130.

An integrated transceiver may comprise at least three optical interfaces, including two transmitter input ports to interface to the CW light sources, labeled as CW Laser In 101A and 101B; and a transmitter/receiver input/output port to interface to the fiber carrying the optical signal, labeled Optical Signals In/Out.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

In an example embodiment of the disclosure, external continuous-wave (CW) light sources are used. This architecture allows heat sinking and temperature control of the source separately from the photonically-enabled integrated circuit 130. External light sources may also be connected to the photonically-enabled integrated circuit 130 via a fiber interface. The light source assemblies may be attached to the photonically-enabled integrated circuit 130.

In an example scenario, a method is disclosed for a multi-wavelength bi-directional transceiver. Grating couplers that receive and transmit more than one wavelength may be utilized to launch a plurality of wavelengths down a single fiber. Additionally, optical signals may travel in either direction through grating couplers, i.e., the optical signals may be received from a fiber and communicated to waveguides on the photonically-enabled integrated circuit 130 or optical signals received from waveguides may be launched in the photonically-enabled integrated circuit 130 and launched into an optical fiber.

Figure 1B:
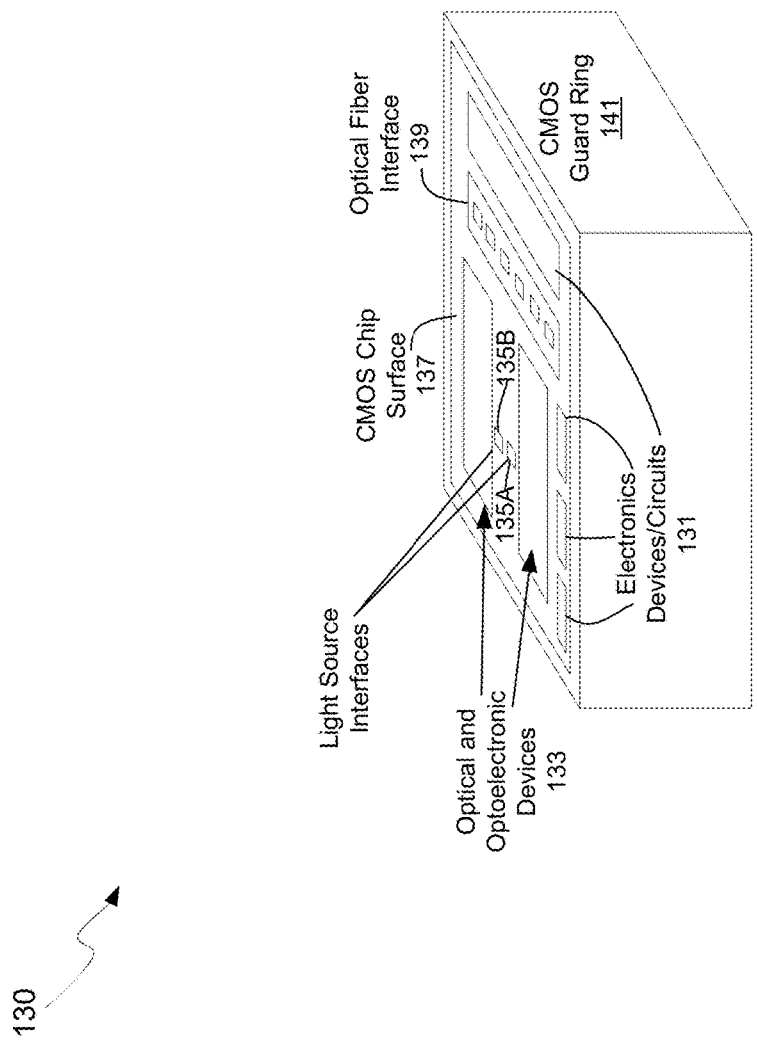
FIG. 1B is a diagram illustrating an exemplary photonically-enabled integrated circuit with bi-directional multi-wavelength grating couplers, in accordance with an exemplary embodiment of the disclosure.

FIG. 1B is a diagram illustrating an exemplary photonically-enabled integrated circuit with bi-directional multi-wavelength grating couplers, in accordance with an exemplary embodiment of the disclosure. Referring to FIG. 1B, there is shown the photonically-enabled integrated circuit 130 comprising electronic devices/circuits 131, optical and optoelectronic devices 133, light source interfaces 135A and 135B, a chip front surface 137, an optical fiber interface 139, and a CMOS guard ring 141.

The light source interfaces 135A/135B and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I, described with respect to FIG. 1A, for example.

In an example scenario, the light source interfaces 135A/135B and the optical fiber interface 139 may be bi-directional, so that optical signals may be communicated in either direction, i.e., received from a source external to the chip or communicated from the chip to an external device. In addition, the light source interfaces 135A/135B and the optical fiber interface 139 may comprise grating couplers that are configured for two or more wavelengths. In an example scenario, the grating couplers may be operable to couple both 1310 nm and 1490 nm optical signals.

Figure 1C:
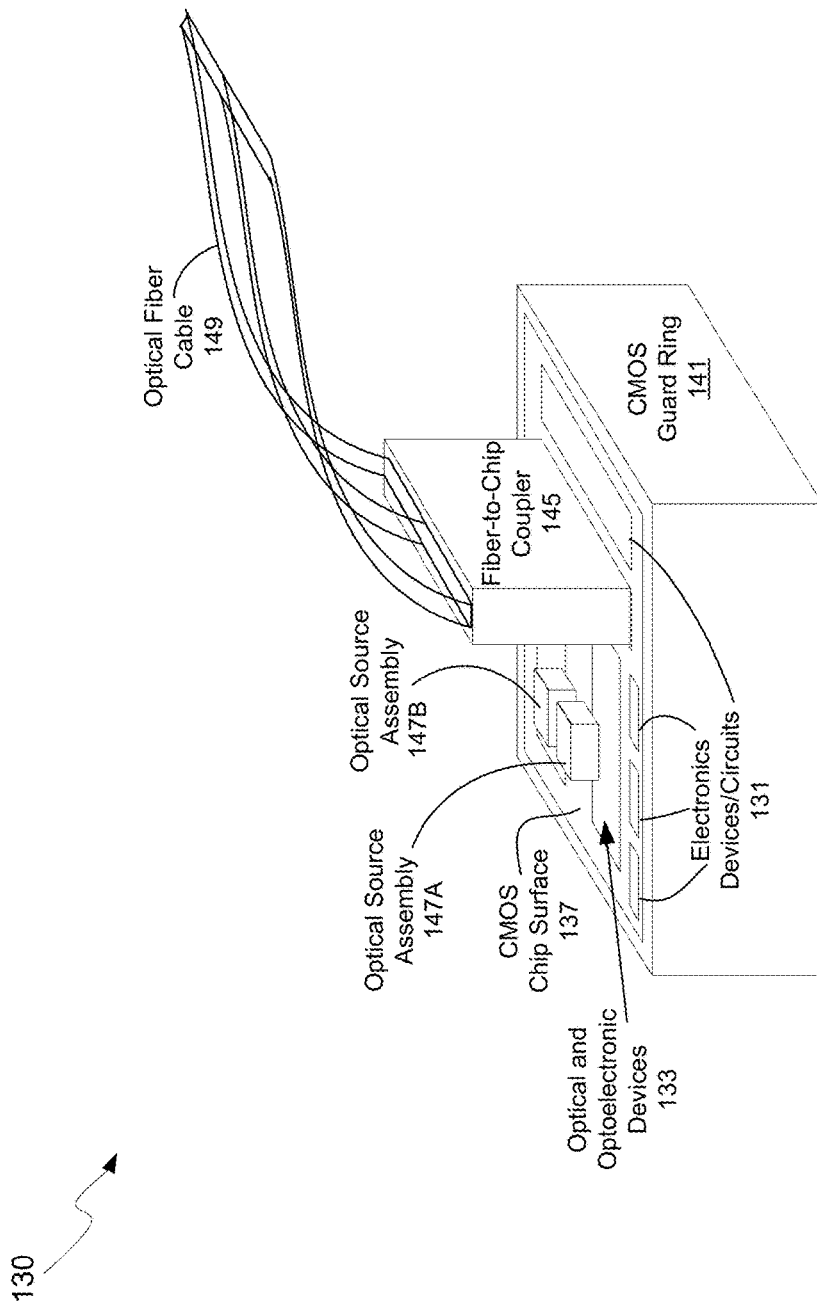
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assemblies 147A and 147B.

The photonically-enabled integrated circuit 130 comprising the electronic devices/circuits 131, the optical and optoelectronic devices 133, the light source interfaces 135A/B, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130 and may be configured to place the optical fibers in the optical fiber cable 149 at an angle from normal to the chip surface 137 for optimum coupling efficiency into the grating coupler. The angle may be defined by the grating coupler design and wavelength of light to be coupled, for example.

In an example scenario, the optical source assemblies 147A and 147B may communicate optical signals at a plurality of wavelengths. In one example, each optical source assembly 147A and 147B generates a different wavelength, such as 1310 nm and 1490 nm, for example.

Figure 2:
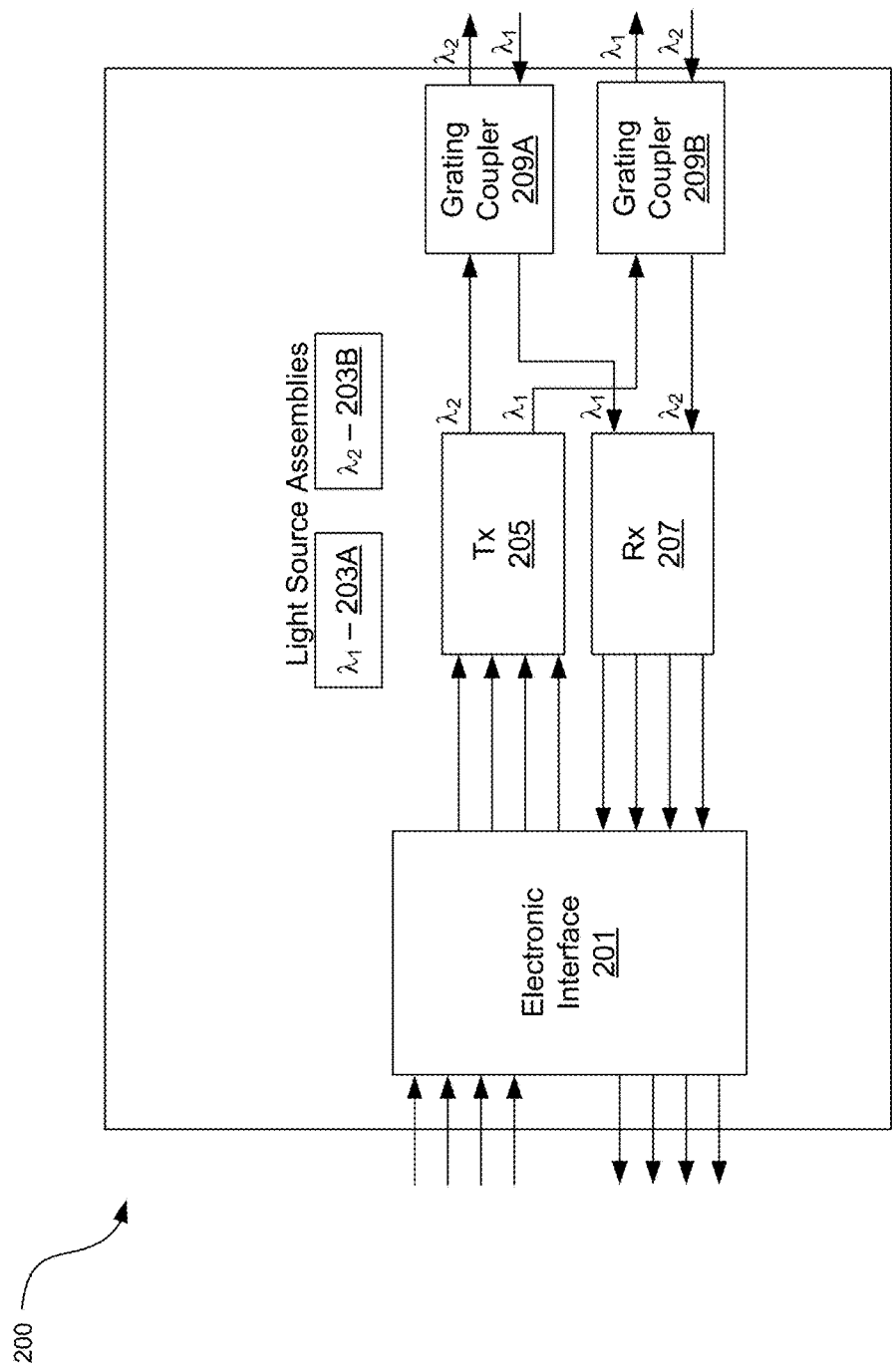
FIG. 2 illustrates a bi-directional multi-wavelength transceiver for standard single-mode fiber, in accordance with an example embodiment of the disclosure.

FIG. 2 illustrates a bi-directional multi-wavelength transceiver for standard single-mode fiber, in accordance with an example embodiment of the disclosure. FIG. 2 may share any aspects of FIGS. 1A-1C. Referring to FIG. 2, there is shown bi-directional multi-wavelength transceiver 200 that may be integrated on a chip, such as the photonically-enabled integrated circuit 130. The bi-directional multi-wavelength transceiver 200 may comprise an electronic interface 201, light source assemblies 203A and 203B, a transmitter module 205, a receiver module 207, and grating couplers 209A and 209B.

The electronic interface 201 may comprise suitable circuitry, logic, and/or code that is/are operable to receive and transmit electrical signals from external devices and also to and from the transmitter module 205 and receiver module 207. In an example scenario, the electronic interface 201 may comprise the electronic interface for a quad small form-factor pluggable package (QSFP) using 4×26 GB/s electronics thereby generating 100 GB/sec signals but with 26 GB/s electronics.

The light source assemblies 203A and 203B may comprise one or more lasers in an assembly that may be bonded to the top surface of the chip comprising the bi-directional multi-wavelength transceiver 200. The assemblies may comprise lenses, rotators, reflectors, and polarizers, for example. Each of the light source assemblies 203A and 203B may comprise a laser with a different wavelength, 1310 nm and 1490 nm, for example. In this manner, two wavelengths may be processed by the bi-directional multi-wavelength transceiver 200, doubling the system speed without requiring double-speed electronics.

The Tx module 205 may comprise optical, optoelectronic, and/or electronic devices for receiving electrical signals from the electronic interface 201 an communicating modulated optical signals at wavelengths λ1 and λ2 to the grating couplers 209A and 209B. Accordingly, the Tx module 205 may comprise elements from FIG. 1A, such as the optical modulators 105A-105C, waveguides 110, control modules 112A-112D, and analog and digital control circuits 109, for example.

Similarly, the Rx module 207 may comprise optical, optoelectronic, and/or electronic devices for receiving modulated optical signals at wavelengths $\lambda_1$ and $\lambda_2$ from the grating couplers 209A and 209B and communicating electrical signals to the electronic interface 201. Accordingly, the Rx module 207 may comprise elements from FIG. 1A, such as the photodiodes 111A-111D, amplifiers 107A-107D, and analog and digital control circuits 109.

Since the grating couplers 209A and 209B communicate optical signals of different wavelength into and out of the chip, the Tx module 205 and the Rx module 207 therefore support duplex operation, making the transceiver 200 a bi-directional multi-wavelength transceiver that can communicate 100 GB/s over two single-mode fibers. With the multi-wavelength bi-directional operation there is no need to split the optical signal from the laser and thus no speed degradation with only pulse amplitude modulation (PAM) penalty and combiner loss. Similarly, there is no need to multiplex/demultiplex with tuning, relevant to power consumption and control loops, for example.

While FIG. 2 shows each grating coupler 209A and 209B receiving one wavelength optical signal and communicating the other wavelength signal out of the bi-directional multi-wavelength transceiver 200, the disclosure is not so limited.

Figure 3:
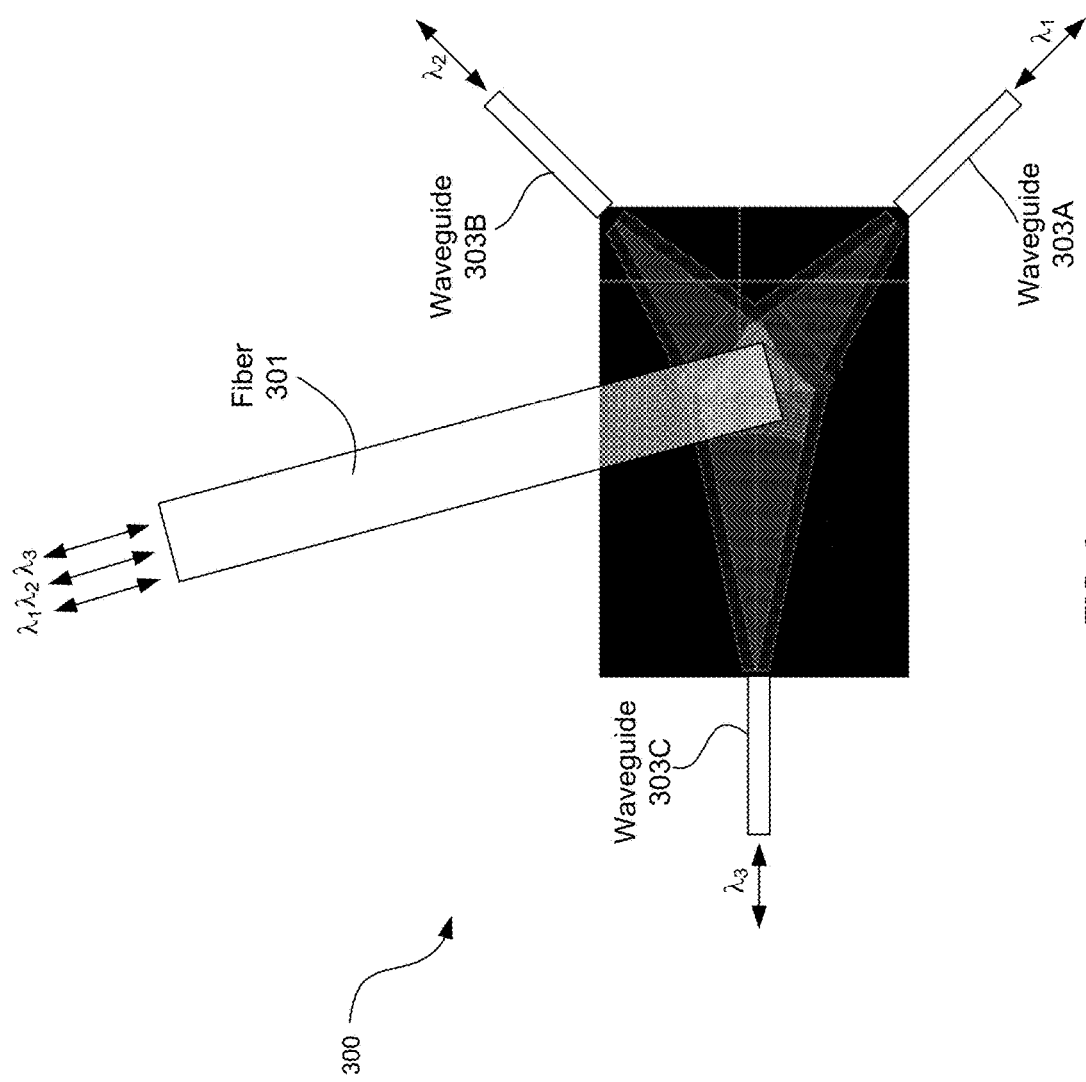
FIG. 3 illustrates a triple grating coupler, in accordance with an example embodiment of the disclosure.
Figure 4:
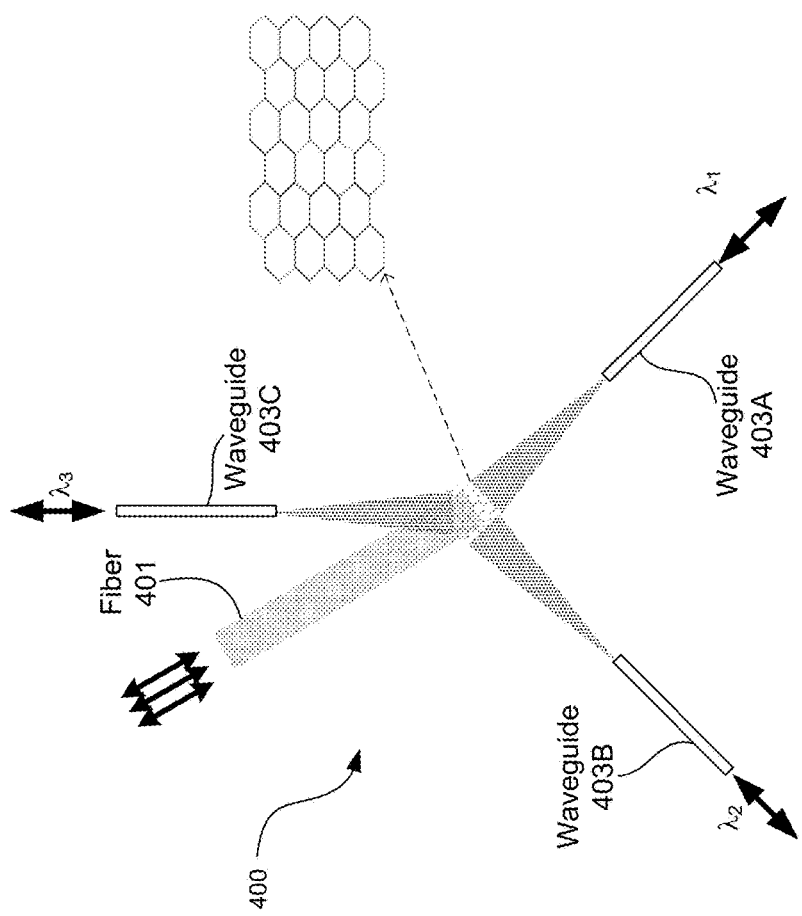
FIG. 4 illustrates another example of a triple grating coupler, in accordance with an example embodiment of the disclosure

Each grating coupler may be operable to communicate optical signals in either direction at one or more wavelengths, as illustrated by the grating couplers in FIGS. 3 and 4, for example.

The diffractive grating used in grating couplers can also be used as a demultiplexer by taking advantage of the special property of the grating that different wavelengths can be directed into different scattering orders, therefore spatially separated, by the grating. One example of this is a demultiplexing grating coupler. A 1D DMGC comprises a one-dimensionally periodic grating. If the fiber above the grating coupler is tilted by a small angle with respect to the normal, along the direction of periodicity, two wavelengths from the fiber can be coupled into the plane of the chip in opposite directions.

FIG. 3 illustrates a triple grating coupler, in accordance with an example embodiment of the disclosure. Referring to FIG. 3, there is shown triple grating coupler 300 with a fiber 301 and waveguides 303A-303C. FIG. 3 may share any aspects of FIGS. 1A-2. The fiber 301 may comprise a single mode fiber, for example, that may be operable to communicate signals into, and receive signals from, the triple grating coupler 300. The angle at which the fiber 301 shown in FIG. 3 is for illustrative purposes only, as the fiber 301 may be closer to perpendicular to the surface, or at a larger angle, depending on the design on the triple grating coupler 300.

Similarly, the waveguides 303A-303C may be operable to communicate optical signals into the triple grating coupler 300 from the chip 130 and/or may receive optical signals from the triple grating coupler 300 via the fiber 301 to communicate to other components in the transceiver. The grates in the regions of the triple grating coupler 300 closest to each of the waveguides 303A-303C may configure the wavelength of the optical signal that is received from the fiber in that waveguide. In an example scenario, the grates may comprise curved waveguide sections, each configured for a desired wavelength. The focusing gratings in each section may be designed appropriately by taking into account the phase matching condition between the fiber mode and the grating mode in each direction. After the proper phase matching is computed, the orientation of the lines making up the 1D grating components is altered. For instance, the grating becomes slightly tilted from the horizontal direction to cause the mode incoming from the vertical direction to be scattered into the fiber. Other relative orientations between the fiber and the two waveguides are also conceivable.

In addition, the waveguides 303A-303C may communicate optical signals at an appropriate wavelength to the corresponding arm of the triple grating coupler 300, determined by which laser source generates the signal.

FIG. 4 illustrates another example of a triple grating coupler, in accordance with an example embodiment of the disclosure. FIG. 4 may share any aspects of FIGS. 1A-3. Referring to FIG. 4, there is shown triple grating coupler 400, a fiber 401, and waveguides 403A-403C. The triple grating coupler 400 may comprise a 2D array of scattering elements. One typical 2D grating structure is based on a combination of two one-dimensionally periodic gratings. The two gratings direct light arriving at it from approximately perpendicular directions, and therefore the 2D grating is topologically similar to a square lattice, where the scatterers are placed at the intersections of the two 1D gratings. A 2D grating with a triangular/hexagonal symmetry, one example of which is shown in FIG. 4, allows the multiplexing of more than two wavelengths. It is based on a combination of three one-dimensionally periodic gratings.

In an example scenario, the three input waveguides 403A-403C are at approximately 120° angle with each other. The scatterers may be placed at the vertices of the lattice. The periodicity of the grating in the three different directions corresponds to the three wavelengths $\lambda_1$, $\lambda_2$, and $\lambda_3$, of the light being coupled to the fiber, according to the phase matching conditions at each wavelength. As in previous figures, the angle at which the fiber 401 is placed with respect to the plane of the triple grating coupler 400 is merely an example for clarity of the figure, and may be configured at a desired angle based on the design of the grates in the triple grating coupler 400.

In operation, the triple grating coupler 400 may receive optical signals at three wavelengths, $\lambda_1$, $\lambda_2$, and $\lambda_3$, via the optical fiber 401 and communicate each wavelength to a separate waveguide 403A-403C. In addition, optical signals of any of the three wavelengths may be communicated from the waveguides 403A-403C to the triple grating coupler 400 and into the optical fiber 401, thereby supporting full duplex operation in a single fiber at multiple wavelengths.

In an example embodiment, a method and system are disclosed for a bi-directional multi-wavelength transceiver for standard single-mode fiber based on grating couplers. In this regard, aspects of the disclosure may comprise, in a photonically-enabled integrated circuit comprising an optoelectronic transceiver, a multi-wavelength grating coupler, and first and second optical source assemblies coupled to the photonically-enabled integrated circuit: coupling a first source optical signal at a first wavelength into the photonically-enabled integrated circuit using the first optical source assembly, coupling a second source optical signal at a second wavelength different from the first wavelength into the photonically-enabled integrated circuit using the second optical source assembly, receiving a first optical data signal at the first wavelength from an optical fiber coupled to the multi-wavelength grating coupler, and receiving a second optical data signal at the second wavelength from the optical fiber.

A third optical data signal at the first wavelength may be communicated out of the optoelectronic transceiver via the multi-wavelength grating coupler. A fourth optical data signal at the second wavelength may be communicated out of the optoelectronic transceiver via the multi-wavelength grating coupler. The photonically-enabled integrated circuit may comprise a complementary metal-oxide semiconductor (CMOS) chip. The optical fiber may comprise a single mode fiber. The multi-wavelength grating coupler may comprise sections of curved waveguides, a first section configured for the first wavelength and a second section configured for the second wavelength. The multi-wavelength grating coupler may comprise a two-dimensional array of scattering elements located at intersections of three one-dimensionally periodic gratings.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
in an integrated circuit comprising an optoelectronic transceiver, a multi-wavelength grating coupler, and first and second optical sources coupled to the integrated circuit:
coupling a first source optical signal at a first wavelength into the integrated circuit using the first optical source;
coupling a second source optical signal at a second wavelength different from the first wavelength into the integrated circuit using the second optical source;
receiving a first optical data signal at the first wavelength from an optical fiber coupled to the multi-wavelength grating coupler; and
receiving a second optical data signal at the second wavelength from the optical fiber coupled to the multi-wavelength grating coupler.

2. The method according to claim 1, comprising communicating a third optical data signal at the first wavelength out of the optoelectronic transceiver via the multi-wavelength grating coupler.

3. The method according to claim 2, comprising communicating a fourth optical data signal at the second wavelength out of the optoelectronic transceiver via a second multi-wavelength grating coupler.

4. The method according to claim 1, wherein the integrated circuit comprises a complementary metal-oxide semiconductor (CMOS) chip.

5. The method according to claim 1, wherein the optical fiber comprises a single mode fiber.

6. The method according to claim 1, wherein the multi-wavelength grating coupler comprises sections of curved waveguides, a first section configured for the first wavelength and a second section configured for the second wavelength.

7. The method according to claim 1, wherein the multi-wavelength grating coupler comprises a two-dimensional array of scattering elements located at intersections of two one-dimensionally periodic gratings.

8. A system for communication, the system comprising:
an integrated circuit comprising an optoelectronic transceiver, a multi-wavelength grating coupler, and first and second optical sources coupled to the integrated circuit, said integrated circuit being operable to:
couple a first source optical signal at a first wavelength into the integrated circuit using the first optical source;
couple a second source optical signal at a second wavelength different from the first wavelength into the integrated circuit using the second optical source;
receive a first optical data signal at the first wavelength from an optical fiber coupled to the multi-wavelength grating coupler; and
receive a second optical data signal at the second wavelength from the optical fiber coupled to the multi-wavelength grating coupler.

9. The system according to claim 8, wherein the integrated circuit is operable to communicate a third optical data signal at the first wavelength out of the optoelectronic transceiver via the multi-wavelength grating coupler.

10. The system according to claim 8, wherein the integrated circuit is operable to communicate a fourth optical data signal at the second wavelength out of the optoelectronic transceiver via a second multi-wavelength grating coupler.

11. The system according to claim 8, wherein the integrated circuit comprises a complementary metal-oxide semiconductor (CMOS) chip.

12. The system according to claim 8, wherein the optical fiber comprises a single mode fiber.

13. The system according to claim 8, wherein the multi-wavelength grating coupler comprises sections of curved waveguides, a first section configured for the first wavelength and a second section configured for the second wavelength.

14. The system according to claim 8, wherein the multi-wavelength grating coupler comprises a two-dimensional array of scattering elements located at intersections of two one-dimensionally periodic gratings.

15. A system for communication, the system comprising:
an integrated circuit comprising an optoelectronic transceiver, and first and second grating couplers, said photonically-enabled integrated circuit being operable to:
communicate a first optical data signal from the optoelectronic transceiver into a first fiber coupled to the first grating coupler;
receive a second optical data signal from the first optical fiber coupled to the first grating coupler;
communicate a third optical data signal from the optoelectronic transceiver into a second optical fiber coupled to the second grating coupler; and
receive a fourth optical data signal from the second optical fiber coupled to the second grating coupler.

16. The system according to claim 15, wherein the first and third optical data signals are at a first wavelength.

17. The system according to claim 16, wherein the second and fourth optical data signals are at a second wavelength different from the first wavelength.

18. The system according to claim 15, wherein the integrated circuit comprises a complementary metal-oxide semiconductor (CMOS) chip.

19. The system according to claim 15, wherein the first and second optical fibers comprise single mode fibers.

20. The system according to claim 15, comprising generating the first optical data signal utilizing a first optical source coupled to the integrated circuit and the second optical data signal utilizing a second optical source coupled to the integrated circuit.

* * * * *